US012619363B2

(12) United States Patent
Hyun et al.

(10) Patent No.: US 12,619,363 B2
(45) Date of Patent: May 5, 2026

(54) STORAGE DEVICE THAT INPUTS ADDITIONAL COMMAND DURING READ DATA OUTPUT TIME AND OPERATING METHOD THEREOF

(71) Applicant: SK hynix Inc., Gyeonggi-do (KR)

(72) Inventors: Hye Rim Hyun, Gyeonggi-do (KR); Seung Gu Ji, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/740,518

(22) Filed: Jun. 12, 2024

(65) Prior Publication Data

US 2025/0251866 A1      Aug. 7, 2025

(30) Foreign Application Priority Data

Feb. 5, 2024      (KR) ......................... 10-2024-0017129

(51) Int. Cl.
*G06F 3/06*      (2006.01)
(52) U.S. Cl.
CPC .......... *G06F 3/0619* (2013.01); *G06F 3/0659* (2013.01); *G06F 3/0673* (2013.01)
(58) Field of Classification Search
CPC ..... G06F 3/0619; G06F 3/0659; G06F 3/0673
See application file for complete search history.

(56) References Cited

U.S. PATENT DOCUMENTS

| | | | |
|---|---|---|---|
| 2021/0096750 A1* | 4/2021 | Balakrishnan | .......... G06F 13/16 |
| 2022/0011974 A1 | 1/2022 | Lee et al. | |
| 2022/0317932 A1 | 10/2022 | Sugahara et al. | |
| 2023/0022082 A1 | 1/2023 | Lu et al. | |
| 2023/0162763 A1 | 5/2023 | Hung et al. | |
| 2025/0123755 A1* | 4/2025 | Kim | ...................... G11C 29/42 |

FOREIGN PATENT DOCUMENTS

| | | |
|---|---|---|
| KR | 10-2009-0113623 A | 11/2009 |
| KR | 10-2016-0122631 A | 10/2016 |
| KR | 10-2021-0017909 A | 2/2021 |

OTHER PUBLICATIONS

Extended European Search Report for European Patent Application No. 24215455.7 issued by the European Patent Office on Apr. 1, 2025.

* cited by examiner

*Primary Examiner* — Jared I Rutz
*Assistant Examiner* — Chen Gu
(74) *Attorney, Agent, or Firm* — IP & T GROUP LLP

(57) ABSTRACT

A storage device may include a memory and a controller. The controller may input, to the memory, a read command for a first plane among the plurality of planes through a first path connected to the first terminal, receive, from the memory, read data for the read command through a second path connected to the second terminal, and input, to the memory, one or more additional commands through the first path in parallel with an operation of receiving the read data during an expected output time of the read data.

11 Claims, 11 Drawing Sheets inputting the read command for the first plane
through the first path connected to the first terminal ~S1110 executing, in parallel, an operation of reading the read data for
the read command and an operation of inputting the additional
commands to the memory during the expected output
time of the read data ~S1120

STORAGE DEVICE THAT INPUTS ADDITIONAL COMMAND DURING READ DATA OUTPUT TIME AND OPERATING METHOD THEREOF

CROSS-REFERENCES TO RELATED APPLICATION

The present application claims priority under 35 U.S.C. 119(a) to Korean patent application number 10-2024-0017129 filed on Feb. 5, 2024, which is incorporated herein by reference in its entirety.

BACKGROUND

1. Technical Field

Various embodiments of the present disclosure generally relate to a storage device that inputs an additional command during read data output time and an operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

Conventional storage device uses a common path for command input and data input and output (input/output). Therefore, while data is being output from the memory, the controller cannot input command to the memory.

SUMMARY

Various embodiments of the present disclosure are directed to provide a storage device capable of preventing unnecessary performance degradation through effective command scheduling when the path used for command input and the path used for data input/output are separated, and an operating method thereof.

In an embodiment of the present disclosure, a storage device may include a memory including a plurality of planes, a first terminal for inputting one or more commands, and a second terminal for inputting or outputting data; and a controller configured to input, to the memory, a read command for a first plane among the plurality of planes through a first path connected to the first terminal, receive, from the memory, read data for the read command through a second path connected to the second terminal, and input, to the memory, one or more additional commands through the first path in parallel with an operation of receiving the read data during an expected output time of the read data.

In another embodiment of the present disclosure, an operating method of a storage device may include inputting, to a memory, a read command for a first plane among a plurality of planes of the memory through a first path connected to a first terminal of the memory; and executing, in parallel, an operation of receiving, from the memory, read data for the read command through a second path connected to a second terminal of the memory, and an operation of inputting, to the memory, one or more additional commands through the first path during an expected output time of the read data.

In another embodiment of the present disclosure, a storage device may include a memory including a first terminal, a second terminal, and a plurality of planes including a first plane; a first path coupled to the first terminal; a second path coupled to the second terminal and separated from the first path; and a controller coupled to the memory through the first and second paths. The controller may transmit, to the memory, a read command for a first plane through the first path, and during an expected output time, simultaneously perform receiving, from the memory, read data for the read command through the second path, and transmitting, to the memory, at least one additional command through the first path. The expected output time may be determined based on a size of the read data, and at least one of an interface speed of the second path and the number of toggles per time of a data strobe signal transmitted to the memory.

According to embodiments of the present disclosure, it is possible to prevent unnecessary performance degradation through effective command scheduling when the path used for command input and the path used for data input/output are separated.

DETAIL DESCRIPTION

Figure 1:
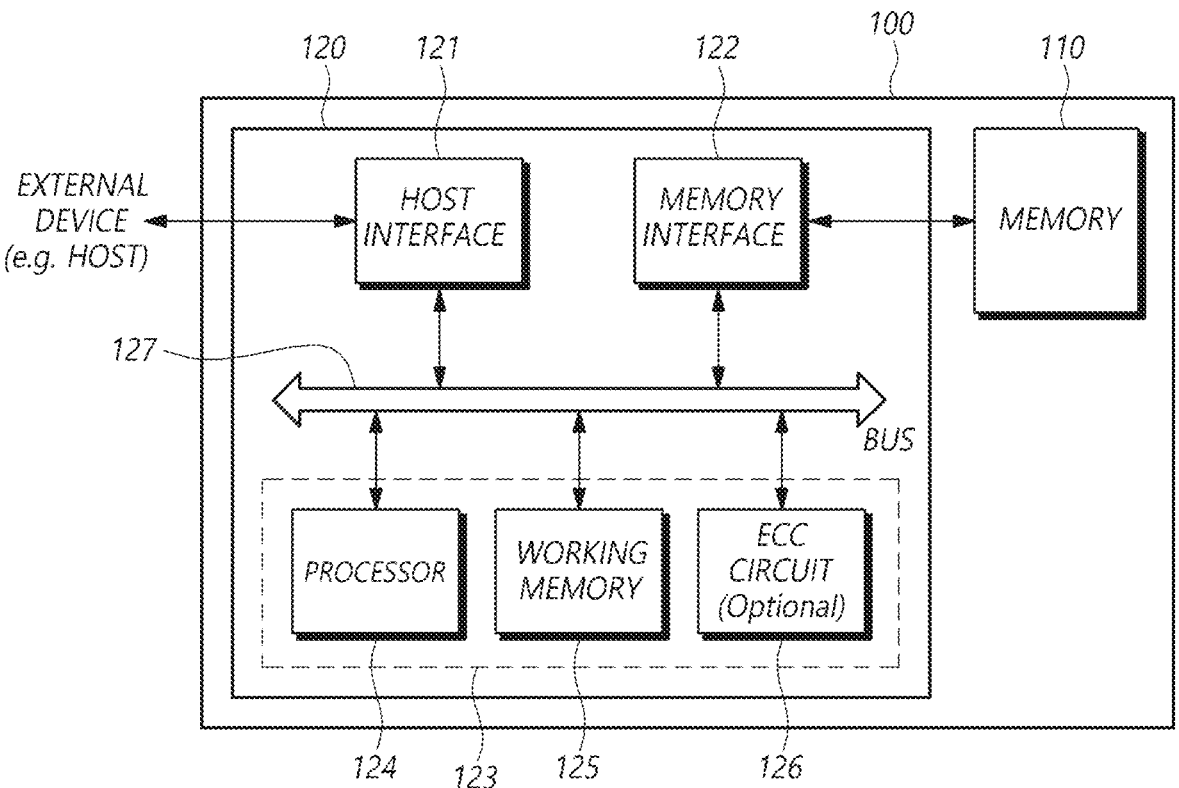
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be embodied in different forms and variations, and should not be construed as being limited to the embodiments set forth herein. Rather, the described embodiments are provided so that this disclosure will be thorough and complete, and will fully convey the present invention to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, a wearable device, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, a radio frequency identification (RFID) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a universal serial bus (USB) protocol, a multimedia card (MMC) protocol, a peripheral component interconnection (PCI) protocol, a PCI-express (PCIe) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware may be a program to be executed in the storage device 100 to drive the storage device 100, and may include various functional layers. For example, the firmware may include binary data in which codes for executing the functional layers, respectively, are defined.

For example, the firmware may include at least one from among a flash translation layer, a host interface layer (HIL), and a flash interface layer (FIL). The flash translation layer performs a translating function between a logical address requested to the storage device 100 from the host and a physical address of the memory 110. The host interface layer (HIL) serves to analyze a command requested to the storage device 100 from the host, and transfers the command to the flash translation layer. The flash interface layer (FIL) transfers, to the memory 110, a command, instructed from the flash translation layer.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store, in the working memory 125, a result of performing the logic calculation defined in the firmware. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading, from the memory 110, the corresponding part of the firmware into the working memory 125.

The processor 124 may load, from the memory 110, metadata necessary for driving firmware. The metadata, which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of a static RAM (SRAM), a dynamic RAM (DRAM) and a synchronous DRAM (SDRAM). The controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is greater than a reference value, the error detection and correction circuit 126 may determine that a corresponding sector is uncorrectable or a fail. On the other hand, when a bit error rate is less than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer, to the processor 124, information (e.g., address information) regarding a sector which is determined to be uncorrectable.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
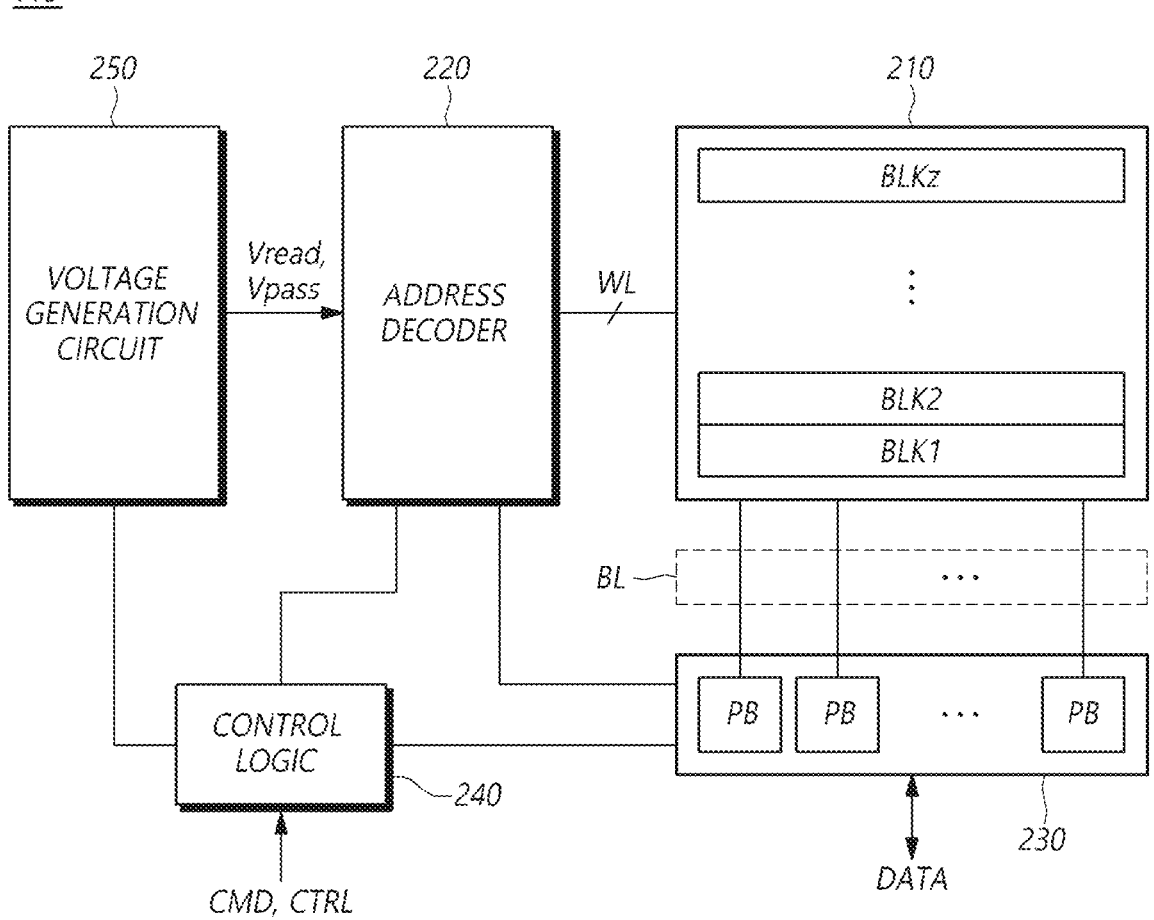
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
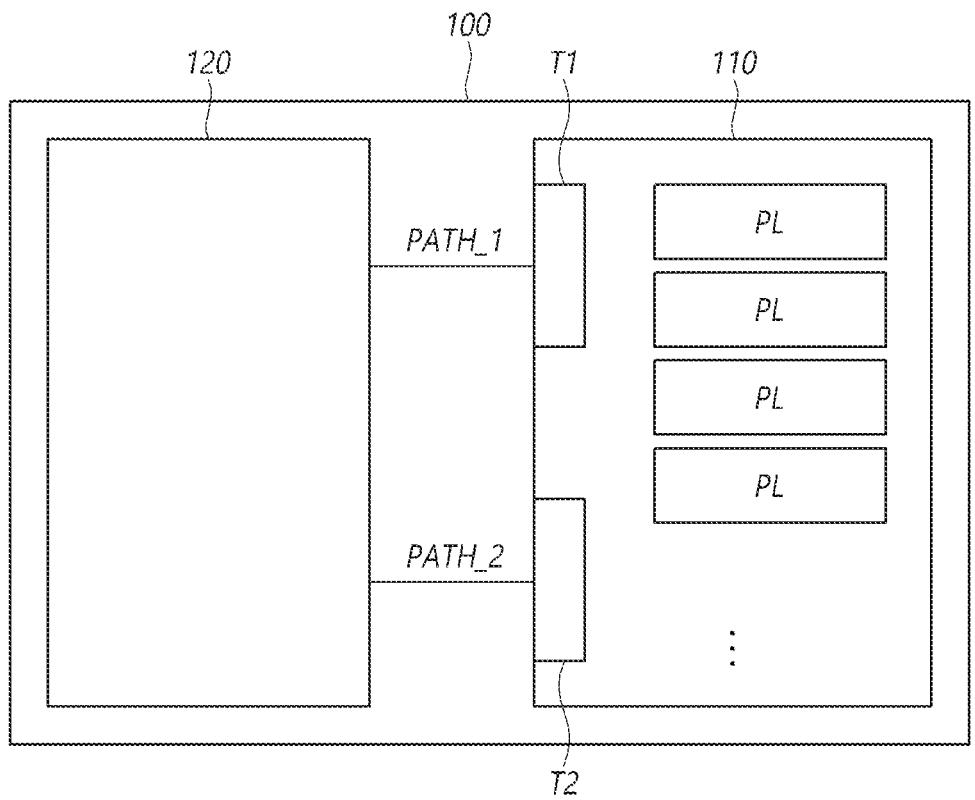
FIG. 3 is a diagram showing schematic structure of a storage device according to an embodiment of the present disclosure.

FIG. 3 is a diagram showing schematic structure of a storage device 100 according to an embodiment of the present disclosure.

Referring to FIG. 3, the storage device 100 may include a memory 110 and a controller 120.

The memory 110 may include a plurality of planes PL, a first terminal T1 for inputting a command, and a second terminal T2 for inputting or outputting data.

The first terminal T1 and the second terminal T2 may each include one or more pins. For example, the first terminal T1 may include one pin, and the second terminal T2 may include a plurality of pins.

Each of the plurality of planes PL may store data. Each of the plurality of planes PL may include a plurality of memory blocks.

The plurality of planes PL may be accessed in parallel. For example, when a read operation or write operation for one plane is performed, an operation for another plane may be performed simultaneously.

In an embodiment, the plurality of planes PL may be included in the same memory die (not shown).

Since the terminal for inputting commands and the terminal for inputting or outputting data are separated, the memory 110 may execute command input operation and data input/output operation in parallel. That is, the memory 110 may input another command through the first terminal T1 while data is being output through the second terminal T2. Accordingly, the memory 110 may execute subsequent operations more quickly because there is no need to wait for subsequent command input until data output is completed.

The controller 120 may communicate with the memory 110 through a first path PATH_1 connected to the first terminal T1 and a second path PATH_2 connected to the second terminal T2.

The first path PATH_1 may be an electrical circuit (e.g., electric wire) connecting the first terminal T1 to the controller 120, and the second path PATH_2 may be an electrical circuit connecting the second terminal T2 to the controller 120. In an embodiment, the interface for the first path PATH_1 and the interface for the second path PATH_2 may be different from each other.

In the embodiments of the present disclosure, since the path used for command communication and the path used for data communication are separated, the order in which the controller 120 inputs command to the memory 110 may affect the overall performance of the storage device 100. Hereinafter, this will be described in detail through FIGS. 4 to 6.

Figure 4:
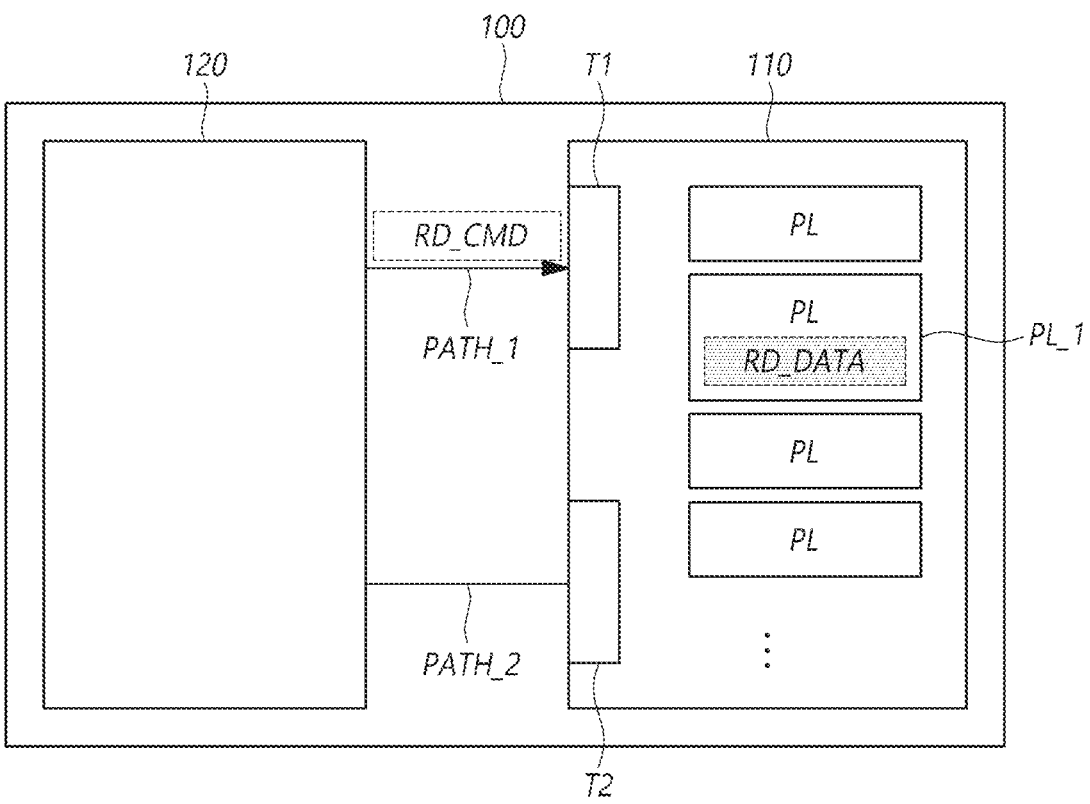
FIG. 4 is a diagram showing an operation in which a controller inputs a read command into a memory according to an embodiment of the present disclosure.

FIG. 4 is a diagram showing an operation in which a controller 120 inputs a read command RD_CMD into a memory 110 according to an embodiment of the present disclosure.

Referring to FIG. 4, the controller 120 may input, to the memory 110, a read command RD_CMD for a first plane PL_1 among the plurality of planes PL through the first path PATH_1 connected to the first terminal T1.

The read command RD_CMD is a command that requests to read data RD_DATA (i.e., read data RD_DATA) stored in the first plane PL_1. The memory 110 may output the data RD_DATA in response to the read command RD_CMD.

Figure 5:
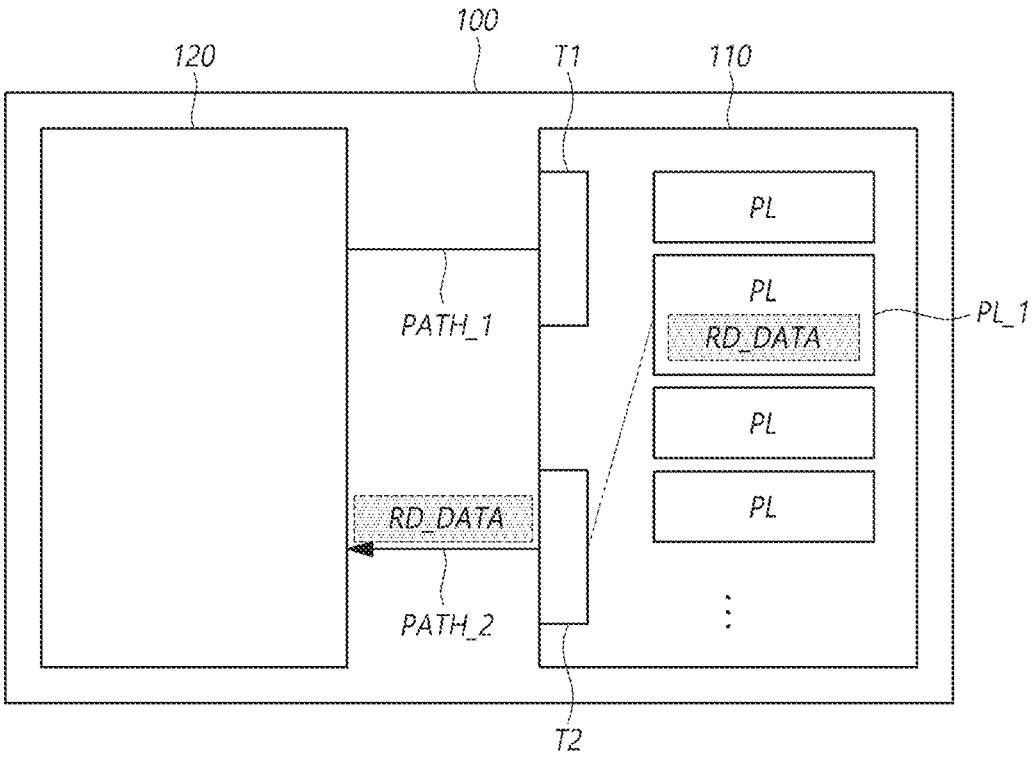
FIG. 5 is a diagram showing an operation in which a controller receives read data for a read command from a memory according to an embodiment of the present disclosure.

FIG. 5 is a diagram showing an operation in which a controller 120 receives, from a memory 110, read data RD_DATA for a read command RD_CMD according to an embodiment of the present disclosure.

Referring to FIG. 5, the memory 110 may output, to the controller 120, the read data RD_DATA for the read command RD_CMD through a second path PATH_2 connected to the second terminal T2.

Therefore, the controller 120 may read the read data RD_DATA output from the memory 110 through the second path PATH_2.

Figure 6:
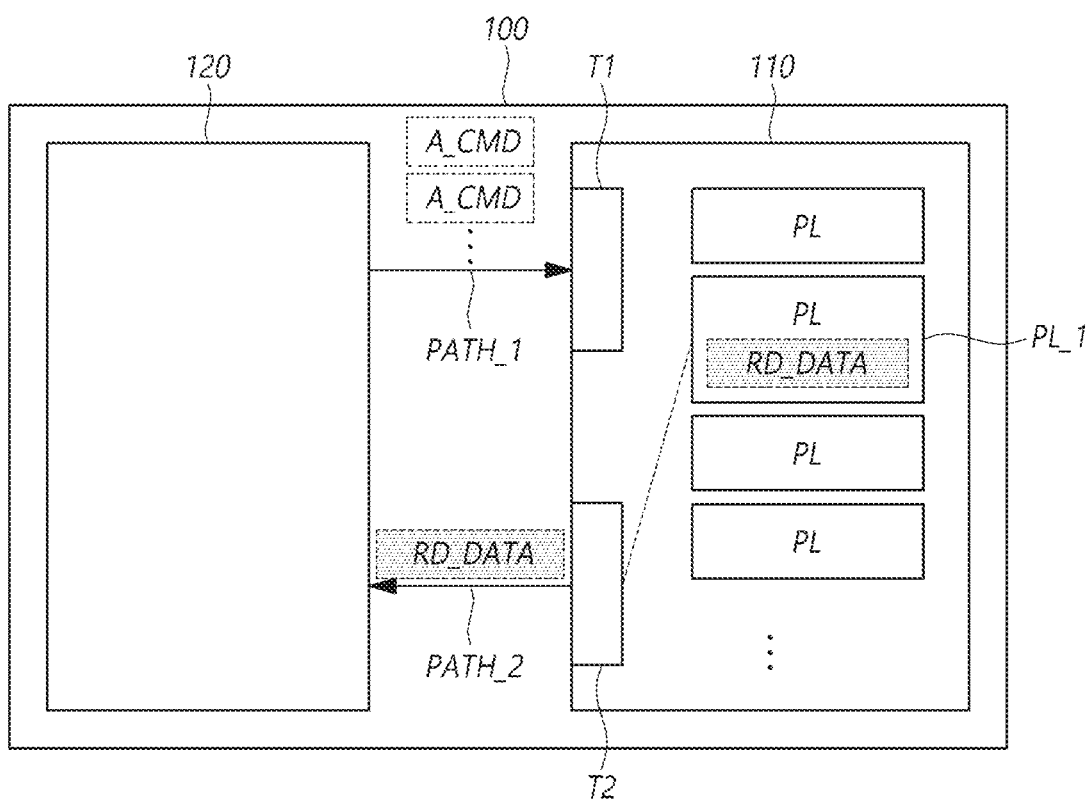
FIG. 6 is a diagram showing an operation in which a controller inputs one or more additional commands to a memory according to an embodiment of the present disclosure.

FIG. 6 is a diagram showing an operation in which a controller 120 inputs, to a memory 110, one or more additional commands A_CMD according to an embodiment of the present disclosure.

Referring to FIG. 6, the controller 120 may input, to the memory 110, one or more additional commands A_CMD through the first path PATH_1 during the expected output time of the read data RD_DATA. An operation of inputting the one or more additional commands A_CMD to the memory 110 may be executed in parallel with an operation of reading the read data RD_DATA output from the memory 110.

The controller 120 may input, to the memory 110, additional commands A_CMD during the output time of the read data RD_DATA, and may allow the memory 110 to execute an operation to process additional commands A_CMD or an operation to prepare for the processing of the additional commands A_CMD. Through this, the controller 120 may perform effective command scheduling.

For this scheduling, while reading the read data RD_DATA, the controller 120 may determine the expected output time in various ways.

For example, the controller 120 may determine the expected output time based on the interface speed for the second path PATH_2 and the size (e.g., 4 KB, 16 KB, 64 KB) of the read data RD_DATA. If the interface speed for the second path PATH_2 is 1 KB/us and the size of the read data RD_DATA is 4 KB, the expected output time is 4 us.

As another example, the controller 120 may determine the expected output time based on the number of toggles per time of the data strobe signal input to the memory 110 and the size of the read data RD_DATA.

Therefore, the expected output time of the read data RD_DATA may vary depending on the read command RD_CMD.

Through this, the controller 120 may effectively perform command scheduling by allowing the memory 110 to execute other operations even while the memory 110 is outputting the read data RD_DATA.

In some embodiments, the controller 120 may need to determine the optimal value of the number of additional commands A_CMD input to the memory 110 during the expected output time. As the time overlapping between the operation of outputting data from the memory 110 and the operation of inputting additional commands A_CMD increases, the performance of the storage device 100 may increase.

If too many additional commands A_CMD are input to the memory 110, the subsequent operation of outputting additional data from the memory 110 may be delayed.

If too few additional commands A_CMD are input to the memory 110, the time that the memory 110 remains in an idle state becomes longer, and as a result, the performance of the storage device 100 may decrease.

The number of additional commands A_CMD input to the memory 110 during the expected output time may be determined as follows.

For example, the controller 120 may determine the number of additional commands A_CMD so that the total input time of the additional commands A_CMD is less than or equal to the expected output time. At this time, the number of additional commands A_CMD is less than a predetermined maximum value.

If the expected output time is 1 us and the input time of each of the additional commands is 0.3 us, the controller 120 may input, into the memory 110, up to 3 additional commands A_CMD since (0.3 us*3)=0.9 us<1 us.

As another example, the controller 120 may set a timer that expires after the expected output time from the time the read data starts to be output from the memory 110, and may input, into the memory 110, additional commands one by one Further, the controller 120 may compare the remaining time of the timer with the input time of additional command to be inputted, and input the additional command to the memory 110 if the remaining time of the timer is greater than the input time of the additional command.

For example, if the remaining time of the timer is 1 us and the input time of the additional command is 0.3 us, the controller 120 may input the additional command into the memory 110. On the other hand, if the remaining time of the timer is 0.2 us and the input time of the additional command is 0.3 us, the controller 120 may not input the additional command into the memory 110.

Figure 7:
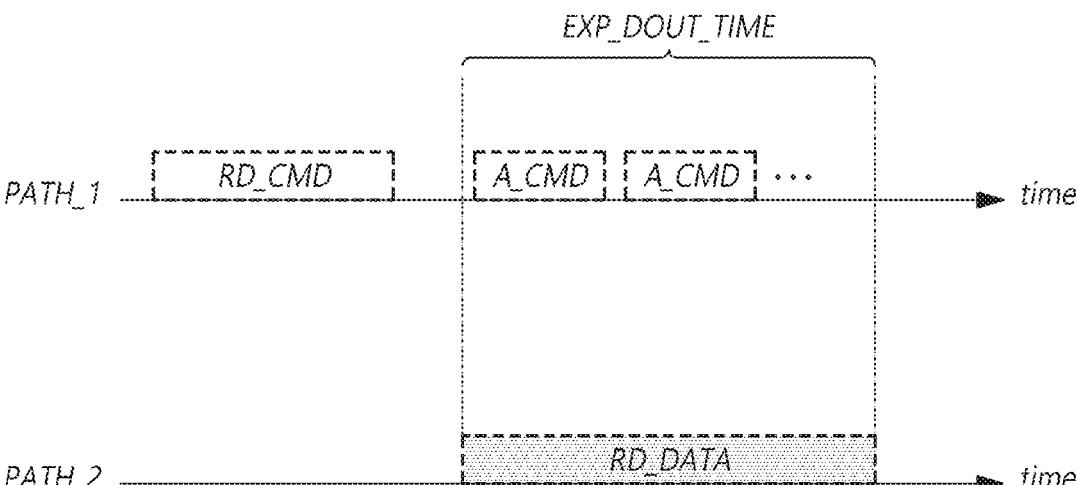
FIG. 7 is a diagram showing status of a first path and a second path over time according to an embodiment of the present disclosure.

FIG. 7 is a diagram showing status of a first path PATH_1 and a second path PATH_2 over time according to an embodiment of the present disclosure.

Referring to FIG. 7, a read command RD_CMD is input to the memory 110 from the controller 120 through the first path PATH_1.

Afterwards, read data RD_DATA for the read command RD_CMD is output from the memory 110 to the controller 120 through the second path PATH_2.

One or more additional commands A_CMD may be input to the memory 110 from the controller 120 through the first path PATH_1 during the expected output time EXP_DOUT_TIME for the read data RD_DATA.

In this case, the one or more additional commands A_CMD may include at least one of a read status command for a second plane among the plurality of planes PL and a read sensing command for a third plane among the plurality of planes PL. Hereinafter, this will be described in detail in FIGS. 8 and 9.

Figure 8:
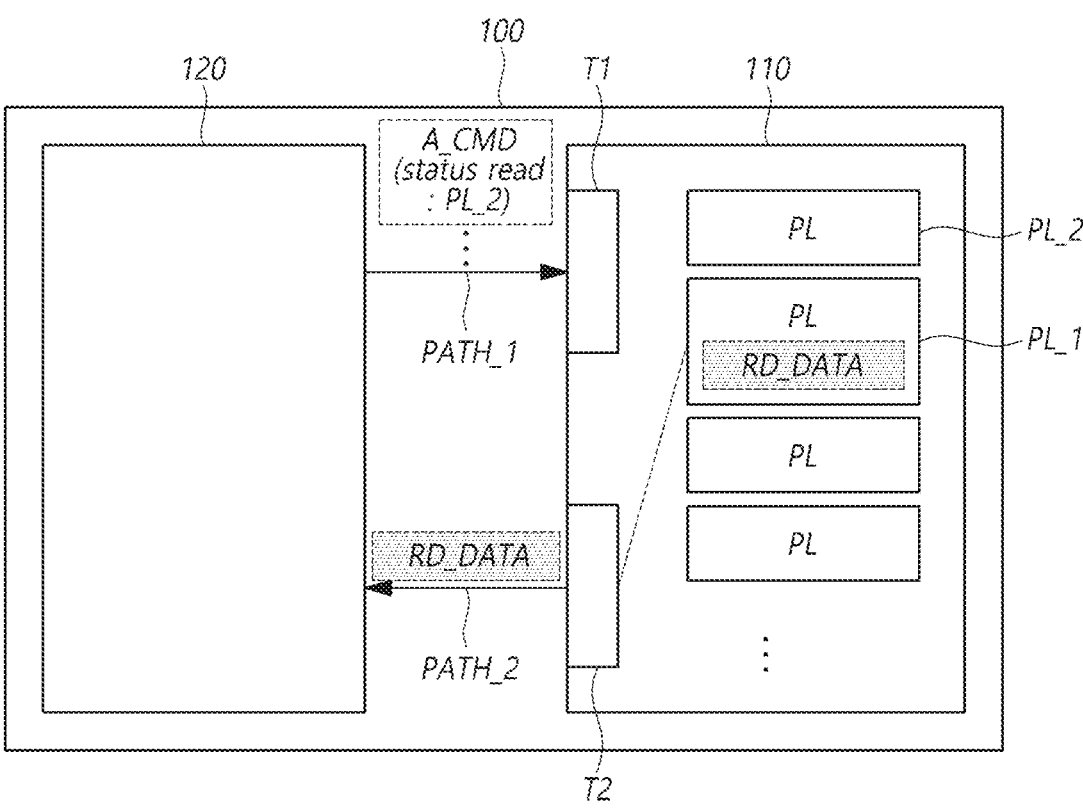
FIG. 8 is a diagram showing an additional command according to an embodiment of the present disclosure.

FIG. 8 is a diagram showing an additional command A_CMD according to an embodiment of the present disclosure.

Referring to FIG. 8, the additional command A_CMD may be a read status RS command for a second plane PL_2 among the plurality of planes PL.

Through this, the memory 110 may immediately transmit, to the controller 120, the status of the second plane PL_2 after outputting the read data RD_DATA stored in the first plane PL_1. Accordingly, the controller 120 may determine the status of the second plane PL_2 more quickly.

Figure 9:
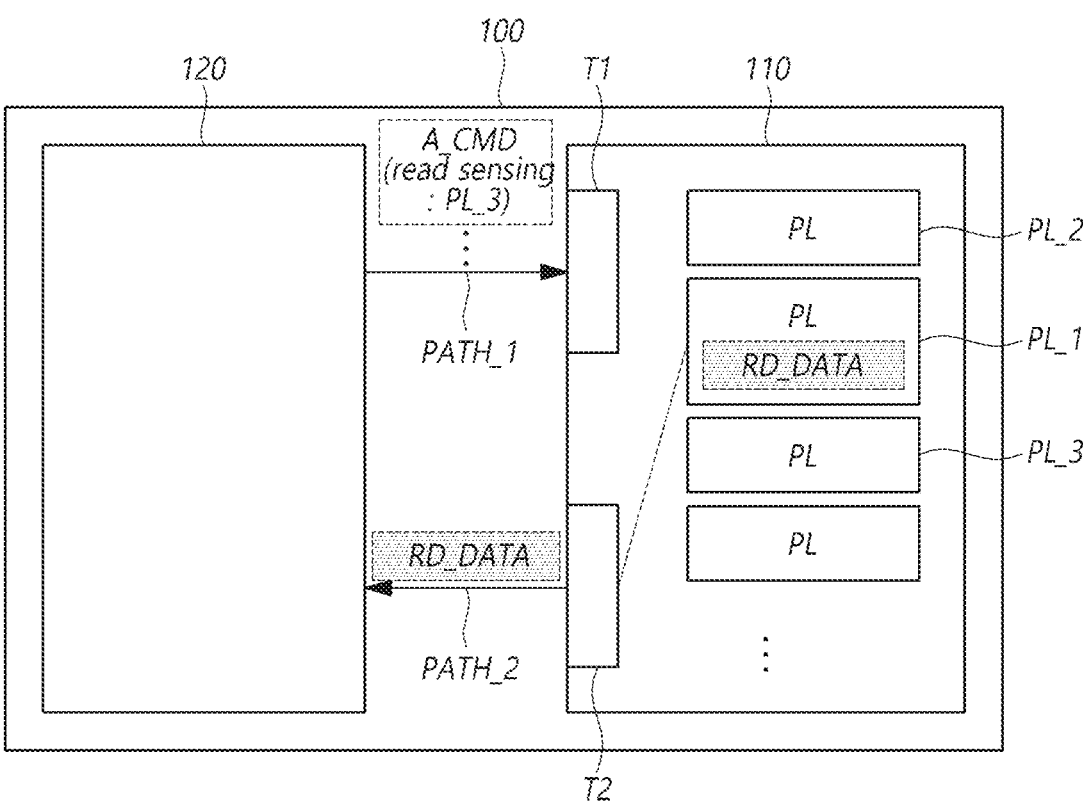
FIG. 9 is a diagram showing another additional command according to an embodiment of the present disclosure.

FIG. 9 is a diagram showing another additional command A_CMD according to an embodiment of the present disclosure.

Referring to FIG. 9, the additional command A_CMD may be a read sensing command for a third plane PL_3 among the plurality of planes PL.

While the read data RD_DATA stored in the first plane PL_1 is output, the memory 110 may process the read sensing command for the third plane PL_3 and preload data stored in the third plane PL_3 into a data buffer (not shown). Through this, the memory 110 may quickly output the data loaded into the data buffer after outputting the read data RD_DATA stored in the first plane PL_1.

In an embodiment, the above-described second plane PL_2 and third plane PL_3 may be adjacent to the first plane PL_1.

When two planes are adjacent to each other, the physical address areas corresponding to the two planes may be continuous. Therefore, the physical address area corresponding to the second plane PL_2 and the physical address area corresponding to the first plane PL_1 may be continuous, and the physical address area corresponding to the third plane PL_3 and the physical address area corresponding to the first plane PL_1 may be continuous.

Figure 10:
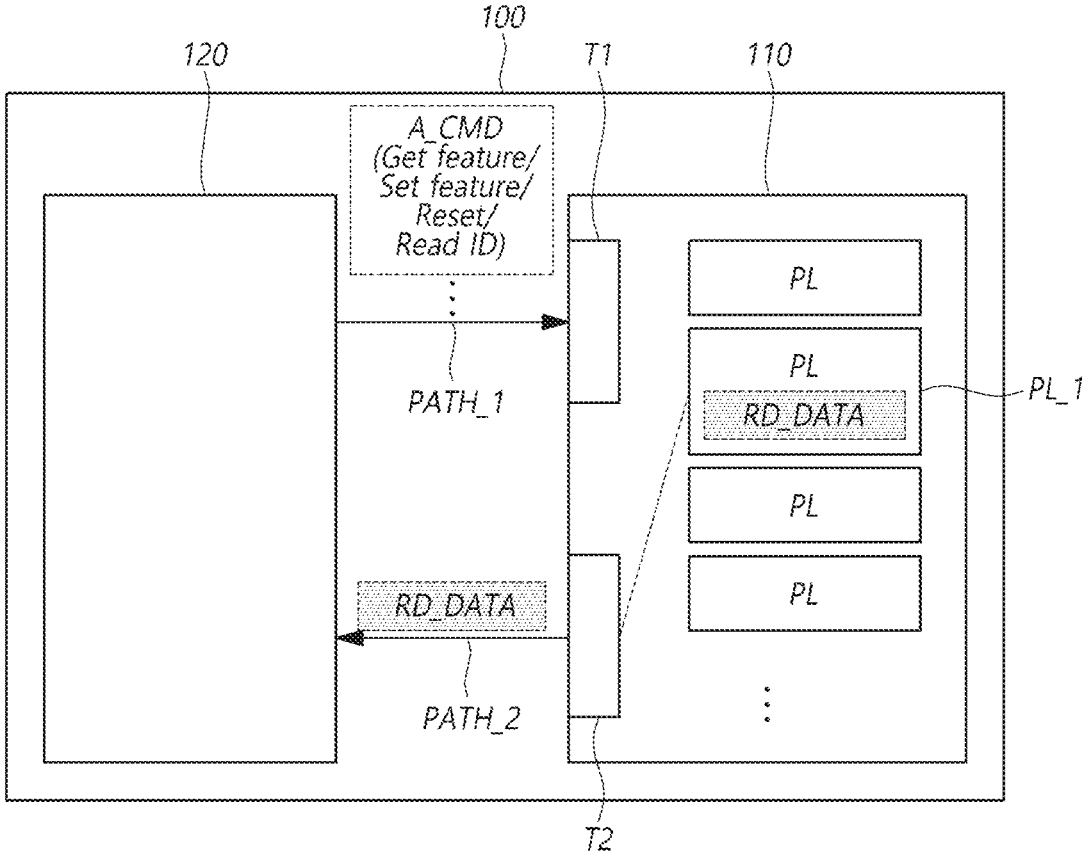
FIG. 10 is a diagram showing other additional commands according to an embodiment of the present disclosure.

FIG. 10 is a diagram showing other additional commands A_CMD according to an embodiment of the present disclosure.

Referring to FIG. 10, the one or more additional commands A_CMD may include at least one of a command for setting a feature of the memory 110, a command for acquiring a feature of the memory 110, a reset command for resetting the memory 110, and a command for reading identification (ID) information of the memory 110.

At this time, the controller 120 may first transmit, to the memory 110, the above-described read status command and read sensing command, and then transmit, to the memory 110, at least one of a command for setting a feature of the memory 110, a command for acquiring a feature of the memory 110, a reset command for resetting the memory 110, and a command for reading ID information of the memory 110.

Figure 11:
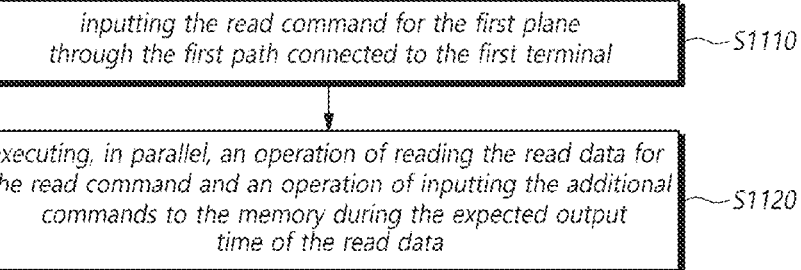
FIG. 11 is a flowchart showing an operating method of a storage device according to an embodiment of the present disclosure.

FIG. 11 is a flowchart showing an operating method of a storage device 100 according to an embodiment of the present disclosure.

Referring to FIG. 11, the operating method of the storage device 100 may include inputting, into the memory 110, the read command RD_CMD for the first plane PL_1 among the plurality of planes PL through the first path PATH_1 connected to the first terminal T1 of the memory 110 including the plurality of planes PL (S1110).

The operating method of the storage device 100 may include executing, in parallel, an operation of reading the read data RD_DATA for the read command RD_CMD through the second path PATH_2 connected to the second terminal T2 of the memory 110, and an operation of inputting, to the memory 110, the one or more additional commands A_CMD through the first path PATH_1 during the expected output time of the read data RD_DATA (S1120).

For example, the expected output time may be determined based on the interface speed for the second path PATH_2 and the size of the read data RD_DATA.

As another example, the expected output time may be determined based on the number of toggles per time of the data strobe signal input to the memory 110 and the size of the read data RD_DATA.

For example, the one or more additional commands A_CMD may include at least one of the read status command for the second plane PL_2 among the plurality of planes PL, and the read sensing command for the third plane PL_3 among the plurality of planes PL. In this case, the second plane PL_2 and the third plane PL_3 may be adjacent to the first plane PL_1.

Although embodiments of the present disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:

a memory including a plurality of planes, a first terminal for inputting one or more commands, and a second terminal for inputting or outputting data; and a controller configured to:

input, to the memory, a read command for a first plane among the plurality of planes through a first path connected to the first terminal, receive, from the memory, read data for the read command through a second path connected to the second terminal, and input, to the memory, additional commands through the first path in parallel with an operation of receiving the read data during an expected output time of the read data, wherein the additional commands include a read status command for a second plane among the plurality of planes and a read sensing command for a third plane among the plurality of planes, and in response to the read sensing command, read data from memory cells of the third plane is temporarily stored into a data buffer for subsequent outputting from the memory.

2. The storage device according to claim 1, wherein the controller is configured to determine the expected output time based on an interface speed for the second path and a size of the read data.

3. The storage device according to claim 1, wherein the controller is configured to determine the expected output time based on a size of the read data, and a number of toggles per time of a data strobe signal input to the memory.

4. The storage device according to claim 1, wherein the second plane and the third plane are adjacent to the first plane.

5. The storage device according to claim 1, wherein the additional commands include at least one of a command for setting a feature of the memory, a command for acquiring the feature of the memory, a reset command for resetting the memory, and a command for reading identification information of the memory.

6. An operating method of a storage device, the operating method comprising:

inputting, to a memory, a read command for a first plane among a plurality of planes of the memory through a first path connected to a first terminal of the memory; and executing, in parallel, an operation of receiving, from the memory, read data for the read command through a second path connected to a second terminal of the memory, and an operation of inputting, to the memory, additional commands through the first path during an expected output time of the read data, wherein the additional commands include a read status command for a second plane among the plurality of planes and a read sensing command for a third plane among the plurality of planes, and in response to the read sensing command, read data from memory cells of the third plane is temporarily stored into a data buffer for subsequent outputting from the memory.

7. The method according to claim 6, wherein the expected output time is determined based on an interface speed for the second path and a size of the read data.

8. The method according to claim 6, wherein the expected output time is determined based on a size of the read data, and a number of toggles per time of a data strobe signal input to the memory.

9. The method according to claim 6, wherein the second plane and the third plane are adjacent to the first plane.

10. The method according to claim 6, wherein the additional commands include at least one of a command for setting a feature of the memory, a command for acquiring the feature of the memory, a reset command for resetting the memory, and a command for reading identification information of the memory.

11. A storage device comprising:

a memory including a first terminal, a second terminal, and a plurality of planes including a first plane;

a first path coupled to the first terminal;

a second path coupled to the second terminal and separated from the first path; and a controller coupled to the memory through the first and second paths, wherein the controller is configured to:

transmit, to the memory, a read command for the first plane through the first path, and during an expected output time, simultaneously perform receiving, from the memory, read data for the read command through the second path, and transmitting, to the memory, additional commands through the first path, and wherein the expected output time is determined based on a size of the read data, and at least one of an interface speed of the second path and a number of toggles per time of a data strobe signal transmitted to the memory, wherein the additional commands include a read status command for a second plane among the plurality of planes and a read sensing command for a third plane among the plurality of planes, and in response to the read sensing command, read data from memory cells of the third plane is temporarily stored into a data buffer for subsequent outputting from the memory.

* * * * *